[11] 3,782,823
[45] Jan. 1, 1974

Kantorski et al.

[54] LASER MICROPROBE

[75] Inventors: Joseph W. Kantorski, Southbridge, Mass.; Donald A. Smith; David A. La Marre, both of Woodstock, Conn.; Donald H. Hansen, Williamsville, N.Y.; Milton R. Thorburn, Southbridge, Mass.

[73] Assignee: American Optical Corporation, Southbridge, Mass.

[22] Filed: Mar. 23, 1972

[21] Appl. No.: 237,421

[52] U.S. Cl. ........... 356/85, 219/121 L, 331/94.5 A, 350/81
[51] Int. Cl. ............................................... G01j 3/02
[58] Field of Search ................ 331/94.5 A; 356/85, 356/86; 350/81; 219/121 L

[56] References Cited
UNITED STATES PATENTS
3,348,547 10/1967 Kavanagh .......................... 351/6 UX
3,463,594 8/1969 Myer .................................. 356/172

OTHER PUBLICATIONS

Peppers et al.: Analytical Chemistry, Vol. 40, No. 8, July 1968, pages 1178–1182.
Peppers: Applied Optics, Vol. 4, No. 5, May 1965, pages 555–558.
Rasberry et al.: Applied Optics, Vol. 6, No. 1, January 1967, pages 81–86.
Rasberry et al.: Applied Optics, Vol. 6, No. 1, January 1967, pages 87–93.

Primary Examiner—Ronald L. Wibert
Assistant Examiner—F. L. Evans
Attorney—William C. Nealon et al.

[57] ABSTRACT

A laser microprobe including a laser and microscope in combination with variable attenuators and pinholes to direct radiation at a microscope object and to spectroscopically analyze the effects thereof. A combined shutter and occluder permit observation through the eyepiece for alignment and subsequent discharge of the laser without danger to the operator.

5 Claims, 3 Drawing Figures

LASER MICROPROBE

BACKGROUND OF THE INVENTION

The present invention relates to spectroscopy, particularly spectroscopy in which a laser is used to supply energy to a specimen under examination. More particularly, this invention relates to a combined laser, microscope and optical system by which radiant energy from the laser is directed to a specimen and its effects analyzed.

Laser spectroscopy, by itself, is known to the prior art, and is disclosed, for example, in U.S. Pat. No. 3,463,591, issued to Franken, Cross, and Cross. The Franken et al patent discloses the concept of a laser apparatus to direct radiant energy onto a small area of specimen in order to vaporize the same almost instantaneously. The vapor is then analyzed in a spectroscope to determine its constituent elements. The means by which the foregoing functions are accomplished are only schematically represented.

SUMMARY OF THE INVENTION

It is an object of the present invention to provide a laser microprobe for use in spectroscopy.

Another object is to provide a laser microprobe with means to insure that destructive radiation from the laser is not incident upon the observer's eye.

Another object is to provide such an apparatus with improved accuracy of alignment between laser, microscope, and specimen.

Another object is to provide such an apparatus having a range of adjustability of radiation level and target sizes.

Further objects, advantages, and features of this invention will become apparent from the following description of one embodiment thereof, given in connection with the accompanying drawing.

Briefly, the present invention is practiced in one form by a laser aligned with a variable attenuator, variable pinhole and optics for transmission of radiation from the laser into a microscope and onto an object mounted relative to the microscope. A combination shutter and occluder permit eyepiece observation with visible light and laser discharge onto the object with the light path between object and eyepiece occluded to prevent damage to the observer's eyes.

DRAWING

DESCRIPTION

Figure 1:
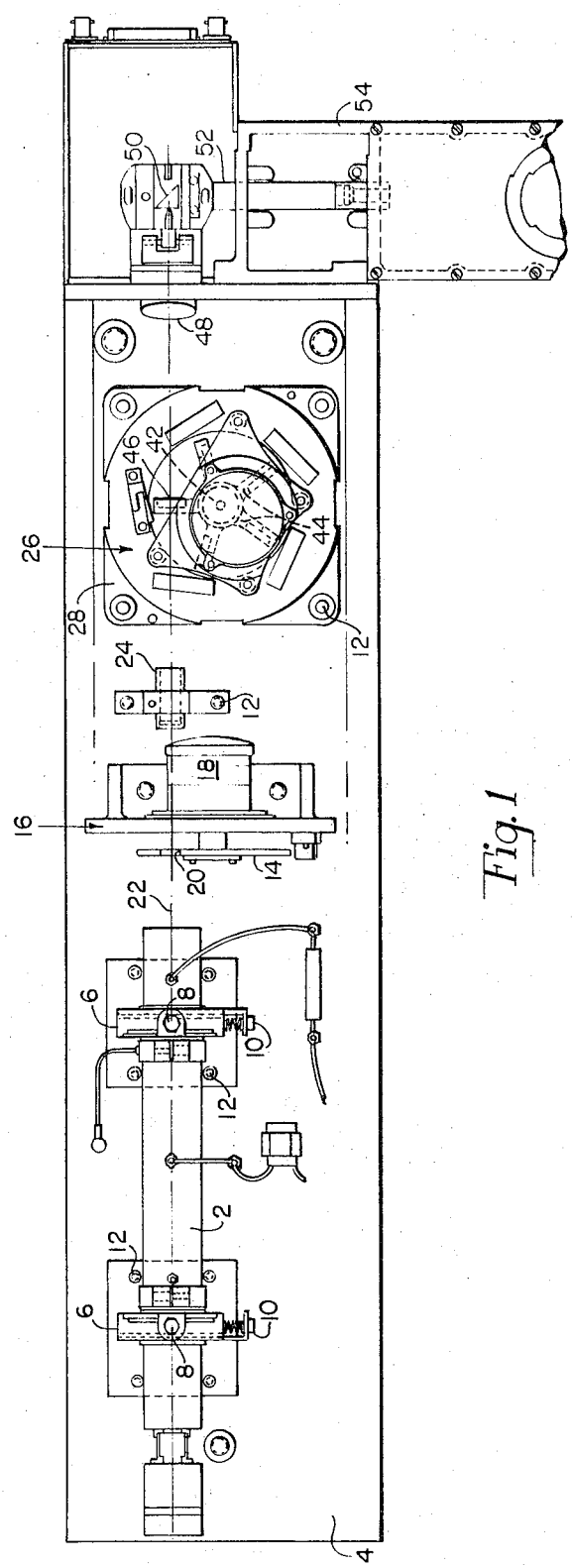
FIG. 1 is a top plan view of a combined laser, filter wheel, pinhole assembly, and prism mount for use in association with a microscope.

Referring now to FIG. 1, a laser is shown at 2. Laser 2 is preferably a neodymium glass laser emitting at 1.06 micron wavelength in the near infrared. Laser 2 is mounted on a base plate or frame 4 by means of a pair of clamps 6, each of these clamps having vertical and horizontal adjustment screws 8 and 10 respectively for the alignment of the laser 2. Clamps 6 are mounted to the frame 4 by suitable fasteners shown for example at 12.

An attenuator disk 14 defines a plurality of apertures spaced circumferentially with respect thereto and is mounted on a filter wheel assembly 16 which is in turn mounted by suitable fasteners 12 to the frame 4. Filter wheel assembly 16 also mounts a disk drive motor 18 for rotation in a vertical plane of the attenuator disk 14 which is connected to the motor 18. The apertures, one of which is represented at 20, in disk 14, are arranged so that their centers are positionable, one at a time, at the optical axis 22 of the laser 2 and associated system. In other words, by the rotatability of disk 14, each of its apertures 20 can be placed in the optical axis 22 of the system. Motor 18 is suitably controlled so as to rotate disk 14 and stop it at desired positions. Filters or attenuators of differing densities are mounted in several of the apertures 20, one of which is left clear. In one specific embodiment, the filter wheel or attenuator disk 14 carries four calibrated attenuators in addition to one open aperture, by which 10 percent, 25 percent, 50 percent, 75 percent and 100 percent of the energy from the laser 2 is transmitted.

A lens 24 is disposed along the optical axis 22 and is mounted to the frame 4 by suitable fasteners 12.

A pinhole assembly, generally indicated at 26 is mounted to the frame 4 by fasteners 12, and includes a pair of horizontal frame plates 28 and 30, one mounted on the other and spaced therefrom by a plurality of vertical struts 32. A pinhole drive motor 34 is in turn mounted atop frame plate 30 by means of vertical struts 36. Drive motor 34 is a low torque motor and is operatively connected by its drive shaft to a pinhole carrier 38 which is mounted for rotation in a horizontal plane on a suitable bearing 40 relative to the frame plates 28 and 30. Pinhole carrier 38 is shown having a central core portion 42 and a plurality of webs 44 disposed in vertical planes and extending radially from the core 42. Five such webs 44 are shown in the example being described. Each of these webs 44 carries a pinhole 46 for selective positioning in the optical axis 22. Pinholes 46 differ in size depending on the desired function. In this specific embodiment, the pinholes are 0.0032, 0.0064, 0.0096, 0.0120, and 0.0160 inches in diameter to produce target spot sizes of 5, 10, 15, 20, and 25 micrometer diameters respectively when used in conjunction with a 10X objective lens. Motor 34 is operatively connected to a suitable control circuit including microswitches which abut the pinhole carrier to shut off the motor and stop its movement at the positioning of a desired one of the pinholes in the optical axis 22. By rotating the carrier 38 in a plane parallel to rather than perpendicular to optical axis 22, any inaccuracy in the stoppage of motor 34 and carrier 38 is of much less consequence.

A partial reflector 48 is mounted to the frame 4 in the optical axis 22 at a suitable angle relative thereto in order to reflect a part of the energy incident thereon to an energy monitor. A right angle prism 50 is mounted relative to the frame 4 in the optical axis 22 so as to deflect the optical axis 22 by 90°. Prism 50 is mounted for linear adjustability along the optical axis 22 in both its directions, and also for limited rotational adjustability about an axis parallel to that of the laser. By such plural modes of adjustability, the optical axis 22 after deviation by the prism 50 can be placed as desired relative to the associated microscope and optical system.

A relay tube 52 is mounted adjacent the prism 50 to define a path along which the deflected optical axis 22 is directed. Relay tube 52 is mounted relative to a frame 54 which in turn is mounted by suitable fasteners to frame 4. Relay tube 52 has mounted therein a lens 56 which, with lens 24 forms a 2-power telescope. That is to say, lenses 24 and 56 are the eyepiece and objective lenses respectively of a 2-power telescope.

Figure 2:
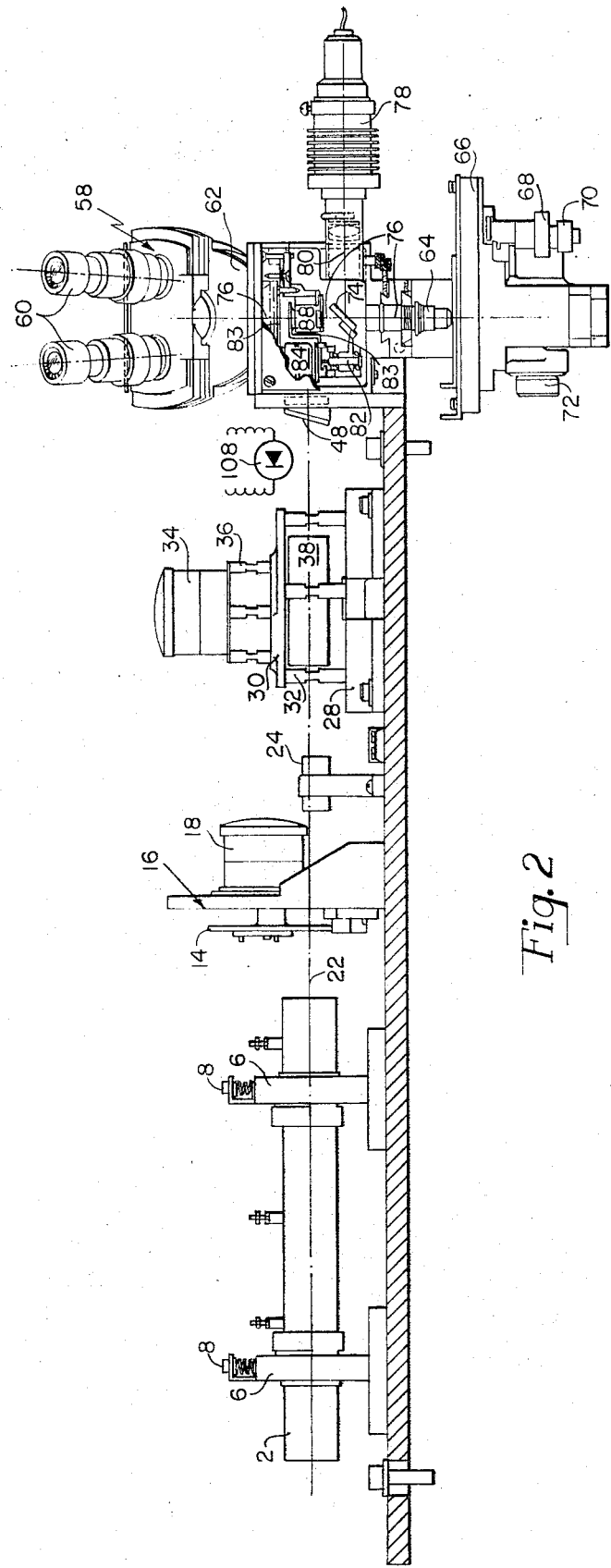
FIG. 2 is a front elevation view of the apparatus shown in FIG. 1, additionally showing an associated microscope.

Referring now especially to FIG. 2, the same apparatus described in FIG. 1 is shown in front elevation view. In addition to the above described elements, FIG. 2 shows a binocular microscope, generally indicated at 58 associated with the laser optical system. Eyepieces 60 are mounted on the microscope body 62 from which an objective 64 is depended. A microscope stage 66 is disposed beneath the objective 64 and includes suitable controls 68, 70, and 72 for X, Y, and Z adjustability of the stage relative to the microscope body.

Between the eyepieces 60 and the objective 64 of this microscope, and within the body 62, a beam splitter 74 is mounted and located in the optical path 76 of the microscope. An illuminator 78 is mounted on the body 62, communicates with the interior of the microscope, and directs light onto the beam splitter 74 along an illumination axis 80. Light from the illuminator 78 is refelcted from the beam splitter 74 along the optical path 76 to illuminate the object or specimen under observation in the incident-light mode of operation of this instrument. Beam splitter 74, being partially transmissive also permits the observer to view the specimen in the eyepieces. Beam splitter 74 is mounted on a rotatable shaft 82 which is operatively connected to a rotary solenoid 84 which is in turn operatively connected to the electrical control system of this apparatus. An occluder 83 is also connected to shaft 82 of solenoid 84 for rotation therewith into and out of the optical path 76 of the microscope. When positioned in the optical path, the occluder is between the eyepiece and a mirror 88 where optical axis 22 joins optical path 26. In the position shown, light from illuminator 78 is reflected onto the specimen for the purpose of alignment and observation through the beam splitter 74 and the occluder is out of the optical path 76. When the rotary solenoid is energized in association with laser system, the beam splitter 74 is moved out of, and the occluder 83 moved into, the optical path 76 of the microscope.

Figure 3:
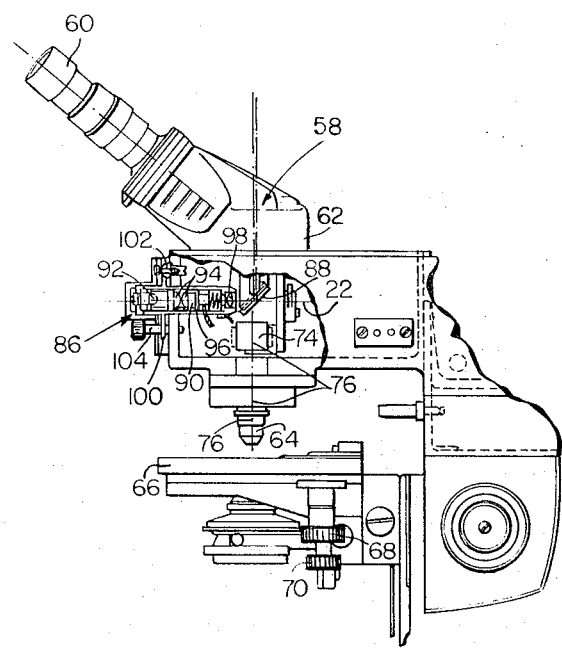
FIG. 3 is a side elevation view showing part of the microscope of FIG. 2 from the right end thereof.

Referring now to FIG. 3, the microscope of FIG. 2 is shown in side elevation view. In this view, the body 62 of the microscope is shown to include a reticle projection unit, generally indicated at 86, and the optical axis 22 of the laser system extending into the microscope body 62. A dichroic mirror 88 is disposed above the beam splitter 74 in the optical path 76 of the microscope. The axis 22 of the laser system and the projection axis 90 of the reticle projection unit 86 are directed at opposite sides of the dichroic mirror 88. By means of dichroic mirror 88, optical axis 22 is deflected along the microscope optical path 76. By its dichroic character, the mirror 88 reflects the 1.06 micron laser radiation while transmitting in the visible range to the eyepieces for the observer.

Reticle projection unit 86 includes a light source 92, a condenser 94, a suitable reticle plate 96, and a projection lens 98, for the projection of the image of reticle 96 into the optical path 76 of the microscope and, by means of dichroic mirror 88, to the eyepieces 60. The reticle projection unit 86 is mounted to the body of the microscope by means of a rocker plate 100 which is mounted by a fastener 102 to permit limited rocking or wobbling motion relative to the microscope body. Plate 100 and the associated reticle projection unit 86 are swingably adjusted relative to fastener 102 by means of a pair of adjusting screws 104, against which plate 100 is spring-biased by springs 106. Fastener 102 is located directly above the reticle projection unit 86 and axis 90; adjusting screws 104 are located below and off-set from the projection axis 90. Thus, only one of the screws 104 appears in this figure. An energy monitor is represented at 108 and is disposed in position relative to beam splitter 48 to receive and detect reflected radiation therefrom. As presently preferred, the beam splitter 48 is calibrated to reflect 8 percent of the radiant energy incident thereon to the monitor 108. Monitor 108 consists of a standard photodiode with suitable electronics which are known per se and need not be described further herein. This monitor 108 is for the purpose of determining the power level of the laser 2. Energy monitor 108 is more fully disclosed in application Ser. No. 108,367, filed Jan. 21, 1971 by Albert D. Battista.

In operation, the microscope user first views through the eyepieces 60 to see a projected reticle pattern from the reticle projection unit 86 superimposed on the image of the object or specimen. Having been preadjusted by a test firing and subsequent adjustment of the reticle, the observed reticle image now indicates the target location on the object whereon the laser energy will be focused. This adjustment is made with the specimen illuminated, either by substage illumination transmitted through the object or by incident illumination from illuminator 78 and beam splitter 74. When aligned as desired, laser operation is commanded by electrical signal which first actuates the solenoid 84 to swing the beam splitter 74 out of the path of the laser and concurrently swings the occluder 83 into the microscope optical path 76 above the dichroic mirror 88. The happening of these two events then permits a trigger signal to operate the laser, discharging its radiation along the optical axis 22 and from the dichroic mirror 88 onto the specimen or target. The presence of occluder 83 above the mirror 88 is a second or backup safety feature preventing any laser energy from getting to the eyepiece.

The microscope described herein is capable of a substantial range of adjustability for various operations. For example, the attenuator disk 14 renders the density of the laser beam adjustable in steps from 10 percent to 100 percent. The several pinholes on carrier 38 make the target spot sizes adjustable in steps with the largest being 5 times the diameter of the smallest. The instrument furthermore has provision for transmitted or incident illumination, and an interlocked shutter-occluder for operator safety.

The foregoing description of an embodiment of this invention is given by way of illustration and not of limitation. The concept and scope of the invention are limited only by the following claims and equivalents thereof which may occur to others skilled in the art.

What is claimed is:

1. A microprobe apparatus including:
   a frame,
   a laser connected to said frame and disposed along a horizontal first optical axis,
   a microscope connected to said frame and including a body with an eyepiece and an objective thereon along a microscope optical path and in operative relationship to an object holder, a dichroic mirror connected to said body, between said eyepiece and said objective, in both said optical path and said first horizontal optical axis and at about 45° relative to said horizontal first optical axis such that said horizontal first optical axis is deflected to a second optical axis by said mirror to coincide with said optical path, a reticle projection unit connected to said body of said microscope and effective to project, along a first projection axis, an image of a reticle and reflect the same along a second projection axis from the side of said dichroic mirror opposite that upon which radiation from said laser is incident, said reticle image being visible through said eyepiece in superimposed relationship to the object image field, attitude adjustment means to align said second projection axis coincident with said optical path, means to transmit radiation from said laser to said mirror so as to direct the same through said objective at a desired target on said object holder, and a pinhole carrier including a plurality of radial web projections and mounted for rotation in the plane parallel to said first optical axis, each of said web projections having means for mounting a pinhole of a different size for selective placement of the same on said first optical axis, thus to control the spot size of the laser radiant energy incident upon said target.

2. A microprobe apparatus as defined in claim 1, further including:

an illuminator mounted on the body of said microscope and effective to direct light thereinto along an illumination axis, a beam splitter mounted within said body and positionable on said illumination axis and at an angle relative thereto such that said illumination axis is deflected by said beam splitter to coincide with said optical path, said beam splitter being movably mounted relative to said optical path and interconnected with said laser so that when said laser is operating, said beam splitter is out of said optical path.

3. A microprobe apparatus as defined in claim 1, and further including:

a battery of attenuators of different densities mounted for selective placement, one at a time, within said first optical axis to control the transmission of laser energy therefrom along said optical axis.

4. A microprobe apparatus as defined in claim 1, and further including:

a partial reflector disposed in said first optical axis and effective to reflect a known portion of the laser radiant energy incident thereupon, and an energy monitor including a photo diode disposed in the path of radiant energy reflected from said partial reflector and means to correlate said reflected radiant energy to the total energy output from said laser.

5. A microprobe apparatus as defined in claim 2 in which said beam splitter is mounted relative to said body on an electrical solenoid device and movable therewith into and out of said optical path, and further including an occluder mounted to said solenoid device for movement therewith into and out of said optical path, said occluder traversing said optical path between said dichroic mirror and said eyepiece, said occluder being in a position out of said optical path when said beam splitter is in a position in said optical path, and visa versa.

* * * * *